US008033166B2

(12) United States Patent
Warren et al.

(10) Patent No.: US 8,033,166 B2
(45) Date of Patent: Oct. 11, 2011

(54) SPARK PLUG SENSOR PROBE UTILIZING PCB AS ANTENNA

(75) Inventors: Gary Warren, Aurora (CA); Herb Krumm, Ashburn (CA); Reginald Grills, Oshawa (CA)

(73) Assignee: Flextronics Automotive Inc., Milpitas, CA (US)

( * ) Notice: Subject to any disclaimer, the term of this patent is extended or adjusted under 35 U.S.C. 154(b) by 450 days.

(21) Appl. No.: 12/285,537

(22) Filed: Oct. 8, 2008

(65) Prior Publication Data

US 2009/0095062 A1 Apr. 16, 2009

Related U.S. Application Data

(60) Provisional application No. 60/960,653, filed on Oct. 9, 2007.

(51) Int. Cl.
*G01M 15/04* (2006.01)

(52) U.S. Cl. .................................................... 73/114.62

(58) Field of Classification Search ............... 73/114.62; 324/393

See application file for complete search history.

(56) References Cited

U.S. PATENT DOCUMENTS 3,286,165 A 11/1966 Small
3,369,175 A * 2/1968 Morris .......................... 324/395
3,886,450 A 5/1975 Trussell et al.
4,004,213 A 1/1977 Kato et al.
4,006,043 A 2/1977 Gaucher et al.
4,008,434 A 2/1977 Schaefer
4,506,546 A * 3/1985 Olson et al. ................ 73/114.64
4,684,896 A 8/1987 Weishaupt
4,937,527 A 6/1990 Sniegowski et al.
5,194,813 A 3/1993 Hannah et al.
5,208,541 A * 5/1993 Yerkovich et al. ............ 324/395
5,317,267 A 5/1994 Miyata et al.
5,363,045 A 11/1994 Martin et al.
5,453,694 A 9/1995 Miyata et al.
5,477,148 A 12/1995 Miyata et al.
5,493,496 A * 2/1996 James et al. .................. 701/102
5,497,092 A 3/1996 Kaszanics
5,554,930 A 9/1996 Miyata et al.
5,644,491 A 7/1997 Fiske et al.
6,396,277 B1 * 5/2002 Fong et al. ..................... 324/402
6,467,448 B2 * 10/2002 Wisnia et al. .............. 123/179.2
6,717,412 B1 * 4/2004 Moritz et al. ................. 324/380
6,850,070 B2 * 2/2005 McQueeney et al. ......... 324/388
2005/0248357 A1 * 11/2005 McQueeney et al. ......... 324/686
2007/0143000 A1 6/2007 Bryant et al.
2009/0165541 A1 * 7/2009 Iwata et al. ................ 73/114.25

FOREIGN PATENT DOCUMENTS

CA 2065123 12/1995
EP 0 439 996 A2 8/1991
EP 92810660.8 3/1993

* cited by examiner

*Primary Examiner* — Freddie Kirkland, III

(74) *Attorney, Agent, or Firm* — Patton Boggs LLP

(57) ABSTRACT

A spark plug sensor antenna including an external housing; and a printed circuit board disposed within the exterior housing, the printed circuit board having a first side and a second side and a first plurality of serpentine traces disposed on one of the first side and second side for receiving radio frequency signals generated by the spark of a spark plug.

12 Claims, 2 Drawing Sheets

SPARK PLUG SENSOR PROBE UTILIZING PCB AS ANTENNA

CROSS-REFERENCE TO RELATED APPLICATIONS

This application claims the benefit of U.S. Provisional Application No. 60/960,653, filed Oct. 9, 2007. The entireties of these aforementioned applications are incorporated herein by reference.

FIELD OF THE INVENTION

The present invention relates to a device for testing the ignition of a spark plug of an internal combustion engine, and more specifically relates to a hand-held spark plug sensor.

DESCRIPTION OF BACKGROUND INFORMATION

It is well known that electromagnetic radio frequency emissions are generated by the ignition wires during normal operation of an engine. It is also well known that by sampling the electromagnetic emissions, ignition information can be obtained for evaluating the operation of the engine. Prior art devices are either triggered by the electromagnetic emissions or measure the amplitude of the emissions to provide spark information. These prior art devices measure the electromagnetic emissions at the spark plug wire or boot, but are not capable of determining whether a spark occurred at the end of the spark plug.

Some prior art testing devices include wire antennas that are bent in shapes and encased in housings. Due to their use of encased bent wires, they are typically more expensive and difficult to manufacture consistently. In addition, it is more difficult to consistently produce high quality prior art testing devices employing encased bent wires due to the inherent process variances associated with manufacturing such encased bent wire devices.

SUMMARY OF THE INVENTION

The above-described problems are solved and a technical advance achieved by the present spark plug sensor probe utilizing a PCB as an antenna ("spark plug sensor"). The present spark plug sensor includes a printed circuit board ("PCB") with traces in a serpentine shape on both sides of the PCB to act as an antenna to detect spark in a spark plug. The PCB may be housed in a snap-together housing that is preferably a weather-proof plastic assembly.

Since the traces on the PCB form the serpentine pattern, there is no need to form the wires into a serpentine shape. The one PCB has serpentine traces on each side that replaces the two bent wires that are typically formed in a serpentine shape of prior art devices. The PCB provides consistent high quality traces in the exact same pattern every time. In comparison, prior art devices that utilize bent wires are not always bent in the identical shape each time.

The present spark plug sensor is produced with less difficult manufacturing processes, thus they are less expensive to make. In part, this is because the PCB and housing manufacturing processes require less labor to assemble than current practice. Additionally, the present spark plug sensor provides an improved PCB antenna over prior art bent wire antennas due to their consistent trace patterns.

In one embodiment, the present spark plug sensor antenna includes an external housing; and a printed circuit board disposed within the exterior housing, the printed circuit board having a first side and a second side and a first plurality of serpentine traces disposed on one of the first side and second side for receiving radio frequency signals generated by the spark of a spark plug. In one aspect, the spark plug sensor antenna further includes a second plurality of serpentine traces disposed on the other of the first side and second side of the printed circuit board. Additionally, the spark plug sensor antenna may further include a first contact in electrical contact with the first plurality of serpentine traces and extending to one end of the exterior housing for connecting with a spark plug sensor module. In another aspect, the spark plug sensor antenna may further include a second contact in electrical contact with the second plurality of serpentine traces and extending to one end of the exterior housing for connecting with a spark plug sensor module. Also, the exterior housing may be a multi-part housing including fasteners for sealing the multi-parts to each other to form a weather-proof exterior housing.

In another embodiment, the present spark plug sensor may include a spark plug sensor including an external housing; a printed circuit board disposed within the exterior housing, the printed circuit board having a first side and a second side and a first plurality of serpentine traces disposed on one of the first side and second side for receiving radio frequency signals generated by the spark of a spark plug; and a spark plug sensor module connected to the external housing and in electrical contact with the first plurality of serpentine traces for converting the radio frequency signals to an output signal for determining one of the presence or absence of the spark.

In one aspect, the spark plug sensor may include a second plurality of serpentine traces disposed on the other of the first side and second side of the printed circuit board. Also, the spark plug sensor may further include a first contact in electrical contact with the first plurality of serpentine traces and extending to one end of the exterior housing for connecting with a spark plug sensor module. In another aspect, the spark plug sensor antenna may further include a second contact in electrical contact with the second plurality of serpentine traces and extending to one end of the exterior housing for connecting with a spark plug sensor module. Additionally, the exterior housing is a multi-part housing including fasteners for sealing the multi-parts to each other to form a weather-proof exterior housing.

In yet another embodiment, the present spark plug sensor may include a method of making a spark plug sensor including providing a multi-part housing for enclosing the spark plug sensor; providing a PCB having a first side and a second side; disposing a first plurality of serpentine traces on one of the first side and the second of the PCB; interconnecting the first plurality of serpentine traces with a circuitry for determining received radio frequency signals by the first plurality of serpentine traces; inserting the PCB, first plurality of serpentine traces, and circuitry within the multi-part housing; and sealing the multi-part housing to form the spark plug sensor. In one embodiment, the step of disposing a first plurality of serpentine traces may further include disposing a second plurality of serpentine traces on the other of the first side and the second of the PCB; and interconnecting the second plurality of serpentine traces with the circuitry for determining received radio frequency signals by the second plurality of serpentine traces. In yet another aspect, the interconnecting the first plurality of serpentine traces may further include connecting the first plurality of serpentine traces to the circuitry with a first contact located within the multi-part housing. Additionally, the interconnecting the second plurality of serpentine traces may further include connecting the second plurality of serpentine traces to the circuitry with a second contact located within the multi-part housing. Also, the method may further include connecting the spark plug sensor with a spark plug sensor module.

In still yet another embodiment, the present invention may include a method for determining the presence or absence of a spark at a spark plug, the method including locating a spark plug sensor having a PCB serpentine trace antenna near an outer shell of the spark plug; detecting the presence or absence of radio frequency signal generated by the spark plug; responsive to receiving the radio frequency signals, determining the presence of the spark at the spark plug; and responsive to not receiving the radio frequency signals, determining the absence of the spark at the spark plug. In one aspect, the method may further include communicating the presence or absence of the spark to a user by illuminating viewable indicia on the spark plug sensor. In yet another aspect, the method may include communicating the presence or absence of the spark to a computer. In still yet another aspect, the locating a spark plug sensor having a PCB serpentine trace antenna may further include placing the spark plug sensor within range of generated radio frequency signals.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE DRAWINGS

Figure 1:
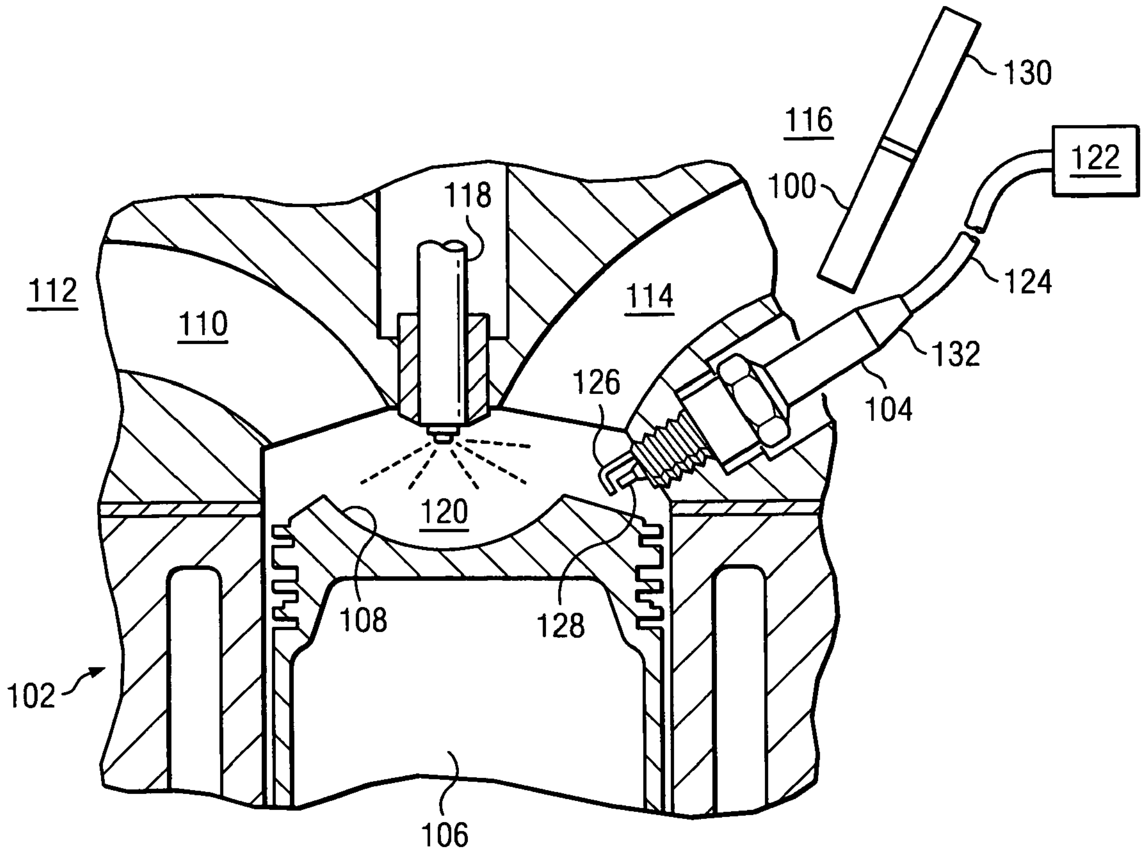
FIG. 1 illustrates a partial cut-away side view of a spark plug sensor proximal to an internal combustion engine according to an embodiment of the present invention.

Referring to FIG. 1, a spark plug sensor 100 shown proximal to spark plug 104 extends partially into combustion cylinder 120 of an internal combustion engine 102. A piston head 108 compresses a fuel/air mixture in combustion cylinder 120, which is then ignited by spark plug 104. This combustion within the combustion cylinder 120 causes the piston head 108 to rotate a crankshaft within the internal combustion engine 102. Fuel is supplied to the combustion cylinder through a fuel injector 118, for example, located within a cylinder head of intake manifold 112. Air is supplied to the combustion cylinder through intake port 110 located within intake manifold 112, for example. The exhaust gases, which are a product of the combustion occurring within the combustion cylinder 120, are exhausted out exhaust port 114 located within an exhaust manifold 116, for example.

Spark plug 104 typically includes a first electrode 126 and a second electrode 128 that form a gap between them for inducing a spark when voltage is supplied to them by a voltage source 122, such as a coil. Voltage is supplied from the voltage source 122 through the plug wire 124 to the spark plug 104 to create a spark between first electrode 126 and second electrode 128 of spark plug 104. A spark plug boot 132 may cover and protect the connection of the plug wire 124 and the spark plug 104. A radio frequency signal is produced during each spark at spark plug 104 that is then detected by spark plug sensor 100 to determine whether an actual spark is occurring between first electrode 126 and second electrode 128 of spark plug 104.

In one embodiment, spark plug sensor 100 may further include spark plug sensor module 130 described as further described herein. Although a single cylinder internal combustion engine 102 is shown, the present spark plug sensor 100 may be used with any number of internal combustion cylinders.

Figure 2:
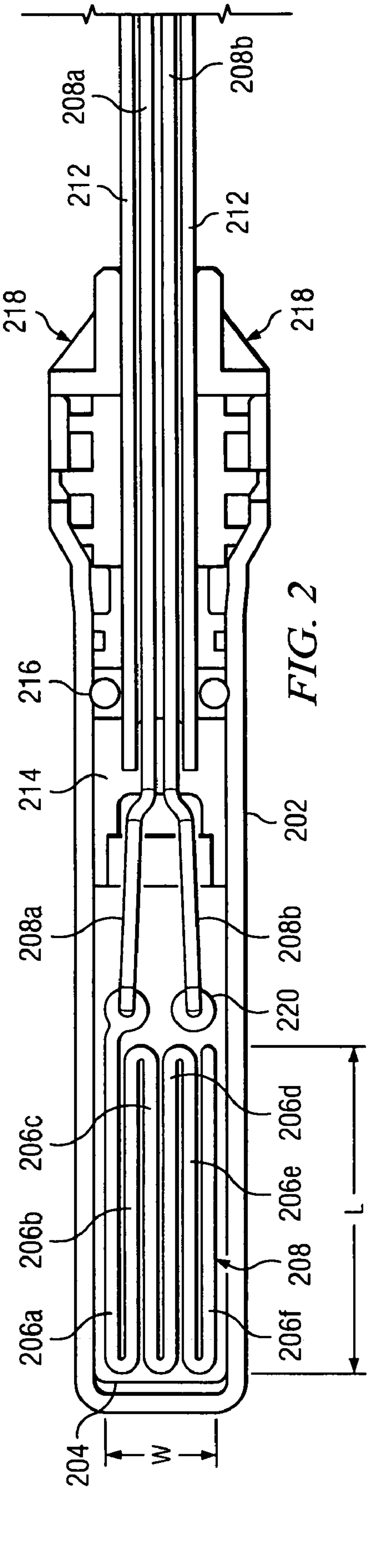
FIG. 2 illustrates an exposed top view of the spark plug sensor of FIG. 1 according to an embodiment of the present invention.
Figure 3:
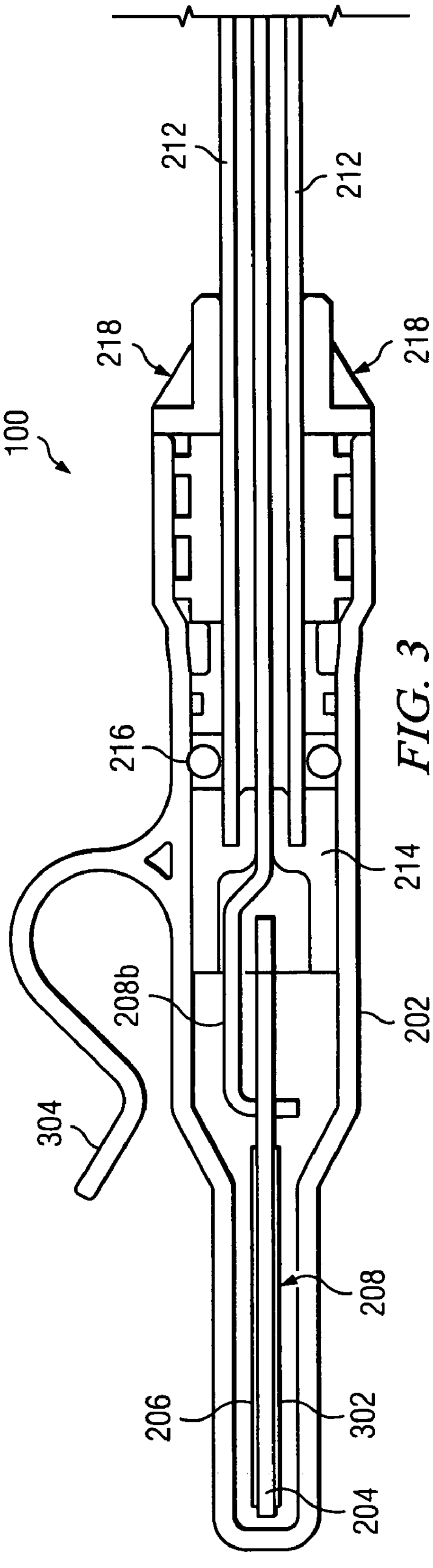
FIG. 3 illustrates an exposed side view of the spark plug sensor of FIG. 2 according to an embodiment of the present invention.

Referring to FIG. 2, spark plug sensor 100 includes a printed circuit board ("PCB") 204, which is preferably located or disposed near the one end of the spark plug sensor 100. PCB 204 preferably mechanically supports and electrically connects certain electronic components, for example, serpentine traces 206*a*, 206*b*, 206*c*, 206*d*, 206*e*, and 206*f* (collectively serpentine traces 206) on one side of PCB 204. PCB 204 may further include via 220 for connecting a wire 208*b* to a second set of serpentine traces located on backside or other side of PCB 204, such as serpentine traces 302, as best illustrated in FIG. 3.

Spark plug sensor 100 may further include contact 208*a* shown connected to serpentine traces 206, which extends from its connection with serpentine traces 206 through the central part or body of spark plug sensor 100 and terminates at the other end of spark plug sensor 100. In one embodiment, serpentine traces 206 are located on one side of PCB 204 and serpentine traces 302 are located on the other side of PCB 204. Serpentine traces 206 and 302 combined comprise the antennae 208 of the spark plug sensor 100. In another embodiment, spark plug sensor 100 may only include one set of serpentine traces located on one side of PCB 204, such as just serpentine traces 206 or 302. Wires or contacts 208*a* and 208*b* are each connected to serpentine traces, one on one side and the one on the other side of PCB 204 and they both extend from their connection bases to the other end of spark plug sensor 100, in one embodiment.

Contacts 208*a* and 208B extend at the other end of the spark plug sensor 100 through a gooseneck tube 212, by extending through the internal cavity or exterior housing 202 of spark plug sensor 100, as shown. The PCB 204 may be held in place or retained within exterior housing 202 by detents, tabs, supports, guides and the like that may be formed within the interior of exterior housing 202. Spark plug sensor 100 may further include o-ring 216 that is fitted within the exterior and located strain relief 218 and the PCB support 214 for sealing between the gooseneck tube 212 and the exterior housing 202 of the spark plug sensor 100.

In one embodiment, spark plug sensor 100 there may be three parts that hold and protect the PCS 204: strain relief 218, PCB support 214, and the exterior housing 212. In one embodiment, the strain relief 218 grips onto the gooseneck tube 212 and holds the assembly in place once the exterior housing 202 is snapped over it. In one embodiment, PCB support 214 and gooseneck tube 212 holds the PCB 204 to contacts 208*a* and 208*b* that fit into the end of the gooseneck tube 212. In one aspect, the contacts 208*a* and 208*b* may be soldered or otherwise connected to serpentine traces 206 and 302.

In one embodiment, the exterior housing 202 is a multi-part unit that is formed or molded from a suitable material such that the multi-parts are snapped together or otherwise sealed to enclose the serpentine traces 206, 302, contacts 208*a*, 208*b*, PCB support 214, and o-ring 216 for example. Each part or component of exterior housing 202 may be molded or formed separately such that they have snap fittings or other type fittings or fasteners, such that the parts seal together to form a weather tight exterior housing 202.

In one embodiment, the exterior housing 202 has guides to hold the PCB exterior housing 202 encloses the PCB support, which may snap onto the strain relief 218. In one aspect, there is an o-ring 216 held in place between strain relief 218 and the PCB support 214, which seals between the gooseneck tube 212 and the exterior housing 202.

Now referring FIG. 3, a side view of the spark plug sensor 100 is shown. Serpentine traces 302 are shown on the lower side of PCB 204 and serpentine traces 206 are shown on the upper side of PCB. Serpentine traces 302 may be the identical or substantially same tracing patterns as serpentine traces 206. Serpentine traces 302 connect with contact 208*b* as shown in this figure. Further as shown, PCB 204 is held in place by PCB support 214 such that it fits snugly within the exterior housing 202 towards the one end of spark plug sensor 100. Additionally, spark plug sensor 100 may include a clip 304 as part of exterior housing 202 for convenient use of spark plug sensor 100.

In one embodiment, spark plug sensor 100 includes six serpentine traces as described above 206*a*, 206*b*, 206*c*, 206*d*, 206*e*, and 206*f* on one side of PCB 204 and six serpentine traces, collectively shown as serpentine traces 302, located on the other side of PCB 204. The lengths (L) and widths (W) of these serpentine traces 206 and 302 may be such as to receive the radio frequency signals that are generated by the spark plug 104. The actual width of each serpentine trace may be approximately 1 millimeter, in one embodiment. The material of each serpentine trace 206 and 302 may be such that it conducts electricity, such as copper, for example. Although, six serpentine traces 206 and 302 are shown, any number of traces may be use in the spark plug sensor 100.

In one embodiment, spark plug sensor 100 may further include a spark plug sensor module 130 is described in FIG. 1. Spark plug sensor 100 may be detachable from spark plug sensor module 130 for convenience and safety. Preferably, spark plug sensor 100 performs as an antenna for receiving radio frequency signals generated by the spark of spark plug 104. The spark plug sensor 130 may further include a power supply and wired circuitry to receive the signals that are transmitted by the spark plug sensor 100. In one embodiment, the spark plug sensor 100 terminates near or around gooseneck tube 212 and plugs or is insertable into spark plug sensor module 130 for ease of use. Spark plug sensor module 130 receives the signals from the contacts 208*a* and 208*b* and converts them through its circuitry into indicia, such as LED signals for use by a user, or other signals to be used by the spark plug sensor 130 or other computing device, for example.

Figure 4:
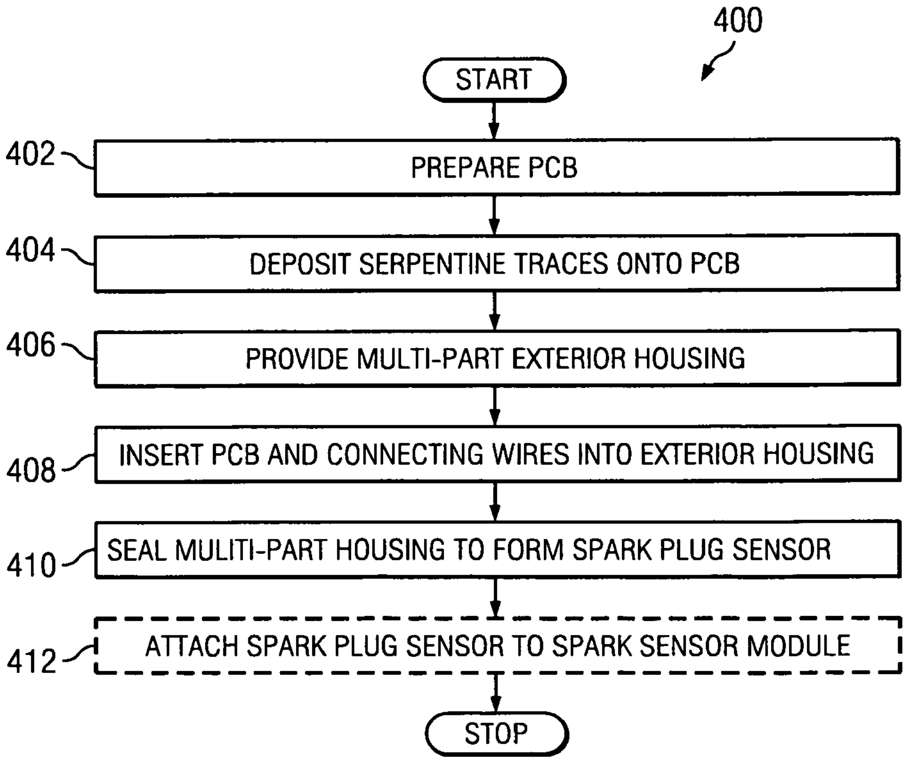
FIG. 4 illustrates a flow diagram for an exemplary process for making a spark plug sensor according to an embodiment of the present invention.

In addition to the aforementioned aspects of embodiments of the present spark plug sensor 100, the present invention further includes methods for making a spark plug sensor. FIG. 4 illustrates embodiment 400 of such a method. In step 402, a PCB is prepared or provided to be used to process serpentine traces on one or both sides of the PCB. This step may include selecting the proper PCB for the later deposition outlaying of the serpentine traces 206 and 302, for example. Additionally necessary vias, such as via 220, may be formed through the PCB at this time. In step 404, serpentine traces, such as serpentine traces 206 and 302, are deposited on each side of the double sided PCB 204, respectively. In step 406, a multipart exterior housing, such as exterior housing 202, is provided ready for insertion of the PCB. This step may include forming or molding separate parts, such as housing halves of exterior housing 202. Further the exterior housing may include snap fittings or other type of fittings or fasteners to provide a weather tight seal once the multipart exterior housing is sealed or snapped together.

In step 408, PCB 204, serpentine traces 206 and 302, along with contacts 208*a* and 208*b*, PCB support 214, and o-ring 216, are inserted into the multipart exterior housing. This step may further include inserting any other additional internal circuitry or pieces of spark plug sensor 100. In step 410, the multipart exterior housing 202 is sealed to form the spark plug sensor 100. In step 412, an optional step of attaching the spark plug sensor 100 to a spark plug sensor module 130 may further be included.

There has been described a spark plug sensor. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, different housings, wirings, circuitry, and the like may be changed or altered to fit within the spark plug sensor described herein or other without departing from the inventive concepts.

What is claimed:

1. A spark plug sensor antenna comprising:
- an external housing;
- a printed circuit board disposed within the exterior housing, the printed circuit board having a first side and a second side and a first plurality of serpentine traces disposed on one of the first side and second side for receiving radio frequency signals generated by the spark of a spark plug; and
- a second plurality of serpentine traces disposed on the other of the first side and second side of the printed circuit board.

2. The spark plug sensor antenna according to claim 1, further comprising:
- a first contact in electrical contact with the first plurality of serpentine traces and extending to one end of the exterior housing for connecting with a spark plug sensor module.

3. The spark plug sensor antenna according to claim 1, further comprising:
- a second contact in electrical contact with the second plurality of serpentine traces and extending to one end of the exterior housing for connecting with a spark plug sensor module.

4. The spark plug sensor antenna according to claim 1, wherein the exterior housing is a multi-part housing including fasteners for sealing the multi-parts to each other to form a weather-proof exterior housing.

5. A spark plug sensor comprising:
- a spark plug sensor comprising:
  - an external housing;
  - a printed circuit board disposed within the exterior housing, the printed circuit board having a first side and a second side and a first plurality of serpentine traces disposed on one of the first side and second side for receiving radio frequency signals generated by the spark of a spark plug;
- a spark plug sensor module connected to the external housing and in electrical contact with the first plurality of serpentine traces for converting the radio frequency signals to an output signal for determining one of the presence or absence of the spark; and
- a second plurality of serpentine traces disposed on the other of the first side and second side of the printed circuit board.

6. The spark plug sensor according to claim 5, further comprising:

a first contact in electrical contact with the first plurality of serpentine traces and extending to one end of the exterior housing for connecting with the spark plug sensor module.

7. The spark plug sensor antenna according to claim 5, further comprising:

a second contact in electrical contact with the second plurality of serpentine traces and extending to one end of the exterior housing for connecting with a spark plug sensor module.

8. The spark plug sensor antenna according to claim 5, wherein the exterior housing is a multi-part housing including fasteners for sealing the multi-parts to each other to form a weather-proof exterior housing.

9. A method of making a spark plug sensor, said method comprising:

providing a multi-part housing for enclosing the spark plug sensor;

providing a PCB having a first side and a second side;

disposing a first plurality of serpentine traces on one of the first side and the second of the PCB, wherein the step of disposing the first plurality of serpentine traces further includes: disposing a second plurality of serpentine traces on the other of the first side and the second of the PCB; and interconnecting the second plurality of serpentine traces with the circuitry;

interconnecting the first plurality of serpentine traces with a circuitry for determining received radio frequency signals by the first plurality of serpentine traces;

inserting the PCB, first plurality of serpentine traces, and circuitry within the multi-part housing; and sealing the multi-part housing to form the spark plug sensor.

10. The method according to claim 9, wherein the interconnecting the first plurality of serpentine traces further includes:

connecting the first plurality of serpentine traces to the circuitry with a first contact located within the multi-part housing.

11. The method according to claim 9, wherein the interconnecting the second plurality of serpentine traces further includes:

connecting the second plurality of serpentine traces to the circuitry with a second contact located within the multi-part housing.

12. The method according to claim 9, further comprising:

connecting the spark plug sensor with a spark plug sensor module.

* * * * *